US010655022B2

(12) United States Patent
Saito et al.

(10) Patent No.: US 10,655,022 B2
(45) Date of Patent: May 19, 2020

(54) POWDER COATING MATERIAL, METHOD FOR PRODUCING POWDER COATING MATERIAL, AND COATED ARTICLE

(71) Applicant: AGC Inc., Chiyoda-ku (JP)

(72) Inventors: Shun Saito, Chiyoda-ku (JP); Masataka Aikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 163 days.

(21) Appl. No.: 16/019,962

(22) Filed: Jun. 27, 2018

(65) Prior Publication Data

US 2018/0305565 A1 Oct. 25, 2018

Related U.S. Application Data

(63) Continuation of application No. PCT/JP2016/088973, filed on Dec. 27, 2016.

(30) Foreign Application Priority Data

Jan. 4, 2016 (JP) .................. 2016-000186

(51) Int. Cl.
| | | |
|---|---|---|
| C09D 127/12 | (2006.01) | |
| C09D 5/36 | (2006.01) | |
| B23B 27/20 | (2006.01) | |
| C09D 167/00 | (2006.01) | |
| C09D 5/03 | (2006.01) | |
| B32B 27/20 | (2006.01) | |
| B32B 27/22 | (2006.01) | |
| C09D 7/40 | (2018.01) | |
| B32B 27/30 | (2006.01) | |
| C09D 133/00 | (2006.01) | |
| C09D 7/62 | (2018.01) | |
| C08K 13/06 | (2006.01) | |
| C08K 5/10 | (2006.01) | |

(52) U.S. Cl.
CPC ................ *C09D 5/36* (2013.01); *B32B 27/20* (2013.01); *B32B 27/22* (2013.01); *B32B 27/30* (2013.01); *C09D 5/035* (2013.01); *C09D 7/40* (2018.01); *C09D 7/62* (2018.01); *C09D 127/12* (2013.01); *C09D 133/00* (2013.01); *C09D 167/00* (2013.01); *C08K 5/10* (2013.01); *C08K 13/06* (2013.01)

(58) Field of Classification Search
None
See application file for complete search history.

(56) References Cited

U.S. PATENT DOCUMENTS

| | | | | |
|---|---|---|---|---|
| 2007/0251420 A1* | 11/2007 | Bolm | ...................... | C09D 5/38 106/287.17 |
| 2015/0072151 A1* | 3/2015 | Saito | ...................... | C23C 26/00 428/421 |
| 2016/0096975 A1* | 4/2016 | Saito | ........................ | C09D 5/03 427/180 |
| 2016/0355690 A1 | 12/2016 | Saito et al. | | |
| 2018/0305565 A1* | 10/2018 | Saito | .................... | C09D 167/00 |

FOREIGN PATENT DOCUMENTS

| | | | | |
|---|---|---|---|---|
| EP | 3 409 737 A1 | 12/2018 | | |
| JP | 2013-159621 | 8/2013 | | |
| JP | 2013159621 A * | 8/2013 | | |
| JP | 2014-218671 | 11/2014 | | |
| WO | WO 2013/186832 A1 | 12/2013 | | |
| WO | WO-2013186832 A1 * | 12/2013 | ........... | C09D 167/00 |
| WO | WO 2014/002964 A1 | 1/2014 | | |
| WO | WO-2014002964 A1 * | 1/2014 | .............. | C08L 27/12 |
| WO | WO 2015/016185 A1 | 2/2015 | | |
| WO | WO-2015016185 A1 * | 2/2015 | ........... | C09D 201/00 |
| WO | WO 2015/159890 A1 | 10/2015 | | |
| WO | WO-2015159890 A1 * | 10/2015 | ........... | C09D 127/12 |
| WO | WO 2015/190462 A1 | 12/2015 | | |
| WO | WO-2015190462 A1 * | 12/2015 | ........... | C09D 167/00 |

OTHER PUBLICATIONS

International Search Report dated Feb. 28, 2017 in PCT/JP2016/088973, filed on Dec. 27, 2016 (with English Translation).

* cited by examiner

*Primary Examiner* — Peter A Salamon
(74) *Attorney, Agent, or Firm* — Oblon, McClelland, Maier & Neustadt, L.L.P.

(57) ABSTRACT

An object of the present invention is to provide a powder coating material capable of forming a coating film excellent in weather resistance, whereby formation of color unevenness or pinholes is suppressed. Further, another object of the present invention is to provide a method for producing the powder coating material and a coated article. The powder coating material of the present invention comprises a powder component containing a fluorinated copolymer which has repeating units based on a fluoroolefin and repeating units based on a monomer having no fluorine atom and which has a fluorine content of at least 10 mass %, and a plasticizer-covered luster pigment, wherein the plasticizer has a melting point of from 30 to 200° C. and a molecular weight of from 200 to 1,000 and which has from 1 to 4 ester groups in one molecule.

12 Claims, No Drawings

POWDER COATING MATERIAL, METHOD FOR PRODUCING POWDER COATING MATERIAL, AND COATED ARTICLE

TECHNICAL FIELD

The present invention relates to a powder coating material, a method for producing a powder coating material, and a coated article.

BACKGROUND ART

In recent years, global warming and environmental destruction have become an international problem, and from the viewpoint of environmental protection, various emission regulations have been set in each country. Among them, discharge of volatile organic compounds (VOC) such as organic solvents into the atmosphere is a serious problem, and de-VOC movement is being advanced by VOC emission regulations.

Also in the paint industry, from the viewpoint of de-VOC movement, powder coating materials have now been widely used. Powder coating materials have no or little content of organic solvents and thus are easy in management of the exhaust gas or solvent waste during their use, and further, it is even possible to recover and reuse the coating materials themselves, and thus, their environmental impact is very low.

On the other hand, in recent years, in various fields such as construction, automobiles, etc., there is an increasing demand for a coating film exhibiting a metallic hue (luster color). In order to form a coating film with a luster color, a powder coating material containing a luster pigment such as aluminum powder or mica powder is used.

As such a powder coating material, a powder coating material made of a powder coating resin having a luster pigment adhered on its surface is known. As a method of letting the luster pigment be adhered to the surface of the powder coating resin, Patent Document 1 discloses a method, as an embodiment of so-called dry blending method, wherein a powder resin and an aluminum powder are mixed at from 50 to 60° C., to soften the surface of the powder resin, thereby to let the aluminum powder be adhered to the powder resin (paragraphs 0062, etc.).

PRIOR ART DOCUMENT

Patent Document

Patent Document 1: U.S. Patent Application Publication No. 2007/0251420

DISCLOSURE OF INVENTION

Technical Problem

However, the powder coating material obtainable by the method described in Patent Document 1 is insufficient in the luster pigment deposition rate on the surface of the powder coating resin, whereby the coating film is sometimes likely to have color unevenness.

Further, the powder coating material is to be used for various applications as mentioned above, and therefore, its coating film is required to have less pinholes, and also required to be excellent in weather resistance.

The present invention has been made in view of the above problem and has an object to provide a powder coating material capable of forming a coating film which is excellent in weather resistance, and wherein formation of color unevenness and pinholes is suppressed. The present invention also has another object to provide a method for producing a powder coating material and a coated article.

SOLUTION TO PROBLEM

The present inventors have intensively studied the above problem and as a result, have found it possible to obtain the desired effects by using a powder coating material comprising a powder component containing a specific fluorinated copolymer, and a luster pigment containing a specific plasticizer layer, and thus have arrived at the present invention.

That is, the present inventors have found that the above problem can be solved by the following constructions.

[1] A powder coating material characterized by comprising a resin powder component containing a fluorinated copolymer which has repeating units based on a fluoroolefin and repeating units based on a monomer having no fluorine atom, and which has a fluorine content of at least 10 mass %, and a plasticizer-covered luster pigment composed of luster pigment particles with their surface covered by a plasticizer, wherein the plasticizer is a plasticizer which has a melting point of from 30 to 200° C. and a molecular weight of from 200 to 1,000, and which has from 1 to 4 ester groups in one molecule.

[2] The powder coating material according to [1], wherein the powder coating material comprises resin particles containing the fluorinated copolymer and particles of the plasticizer-covered luster pigment, and on the surface of the resin particles, the plasticizer-covered luster pigment particles are adhered.

[3] The powder coating material according to [1] or [2], wherein the covering amount of the plasticizer in the plasticizer-covered luster pigment is from 0.01 to 10.0 mass % to the luster pigment before being covered by the plasticizer.

[4] The powder coating material according to any one of [1] to [3], wherein particles of the plasticizer-covered luster pigment contain, between the luster pigment particles and the plasticizer covering layer, a synthetic resin layer containing a synthetic resin.

[5] The powder coating material according to [4], wherein the synthetic resin in the synthetic resin layer is a synthetic resin selected from the group consisting of a (meth)acrylic resin, an epoxy resin, a silicone resin, a polyester resin, a fluororesin, a terpene-type resin, a terpene phenol-type resin, a hydrogenated terpene-type resin and a hydrogenated terpene phenol-type resin.

[6] The powder coating material according to any one of [1] to [5], wherein the luster pigment consists of aluminum particles, mica particles or pearl particles.

[7] The powder coating material according to any one of [1] to [6], wherein the fluorinated copolymer is a fluorinated copolymer wherein, based on all repeating units which the fluorinated copolymer has, the content of repeating units based on the fluoroolefin is from 20 to 70 mol %, and the content of repeating units based on the monomer having no fluorine atom is from 30 to 80 mol %.

[8] The powder coating material according to any one of [1] to [7], wherein the monomer having no fluorine atom is a vinyl ether having no fluorine atom.

[9] The powder coating material according to any one of [1] to [8], wherein the content of the plasticizer-covered luster pigment is from 0.1 to 30 parts by mass to 100 parts by mass of the content of said powder component.

[10] The powder coating material according to any one of [1] to [9], wherein said powder component further contains at least one resin selected from the group consisting of a polyester resin, a (meth)acrylic resin and an epoxy resin, and a pigment other than a luster pigment.

[11] A method for producing a powder coating material as defined in any one of [1] to [10], which comprises mixing said powder component and said luster pigment at a temperature of less than 50° C., to let particles of the plasticizer-covered luster pigment be adhered to the particle surface of said powder component.

[12] A coated article comprising a substrate and a coating film formed on the substrate by the powder coating material as defined in any one of [1] to [10].

Advantageous Effects of Invention

According to the present invention, it is possible to provide a powder coating material capable of forming a coating film excellent in weather resistance, wherein formation of color unevenness and pinholes is suppressed. Further, according to the present invention, it is possible to provide also a method for producing a powder coating material and a coated article.

DESCRIPTION OF EMBODIMENTS

Meanings of terms in the present invention are as follows.

The "melting point" means the temperature at the melting peak as measured by a differential scanning calorimetry (DSC) method.

The "glass transition temperature" means the midpoint glass transition temperature as measured by a differential scanning calorimetry (DSC) method. The "glass transition temperature" may be referred to also as Tg.

The "number average molecular weight" and "weight average molecular weight" are values to be obtained as calculated as polystyrene by a gel permeation chromatography (GPC) method. The "number average molecular weight" may be referred to also as Mn, and the "weight average molecular weight" may be referred to also as Mw.

The term "flake" means having a flat shape.

A "powder coating material" is a powdery coating material, and a "powder resin component" is a powdery coating material component to form a coating film.

The "dry blending" is meant for mixing at least two types of powders (powder particles) without melting the powders (powder particles) and without adding a solvent.

A "molten film" of a powder coating material means a film made from a melt of a powder coating material formed by applying the powder coating material.

A "coating film" formed from a powder coating material is meant for a film formed by cooling a molten film of the powder coating material and, if necessary, curing it.

The term "one coating" means coating only once.

A "reactive group" means a functional group which reacts with a curing agent or the like to cause crosslinking between molecules.

The "fluorine content" in a fluorinated copolymer means the proportion (mass %) of fluorine atoms to all atoms (100 mass %) constituting the fluorinated copolymer.

A "(meth)acrylate" is a general term for an acrylate and a methacrylate, and a "(meth)acrylic resin" is a general term for an "acrylic resin" and a "methacrylic resin".

A "repeating unit" is a general term for a repeating unit which is formed directly by polymerization of a monomer and a repeating unit which is obtainable by chemically converting a portion of the repeating unit formed by polymerization of a monomer. Further, a "repeating unit" may also be referred to simply as a "unit". The contents (mol %) of the respective units in a polymer are obtainable by analyzing the polymer by a nuclear magnetic resonance spectroscopy, but may also be estimated from the charged amounts of the respective monomers.

The powder coating material of the present invention comprises a resin powder component (hereinafter referred to also as a "powder component") containing a fluorinated copolymer which has units based on a fluoroolefin (hereinafter referred to also as "units Xa") and units based on a monomer having no fluorine atom (hereinafter referred to also as "units Xb") and which has a fluorine content of at least 10 mass %, and a plasticizer-covered luster pigment.

The above plasticizer is a plasticizer having a melting point of from 30 to 200° C. and a molecular weight of from 200 to 1,000, and having from 1 to 4 ester groups in one molecule. Hereinafter, the above plasticizer will be referred to also as "the specific plasticizer".

The resin powder component is composed of resin particles, and at least part of the resin particles is composed of particles of a resin containing a fluorinated copolymer. The resin powder component may also contain particles of a resin not containing a fluorinated copolymer.

The plasticizer-covered luster pigment consists of luster pigment particles covered by the specific plasticizer, and may have a synthetic resin layer between the luster pigment particle surface and the plasticizer covering layer.

In the powder coating material of the present invention, particles of the plasticizer-covered luster pigment are preferably attached to the particle surface of the resin powder component. However, there may be particles of the plasticizer-covered luster pigment which are not attached to the particle surface of the resin powder component, and there may be particles of the resin powder component, to which no plasticizer-covered luster pigment particles are attached.

The powder coating material of the present invention may contain particles other than the above resin particles and the plasticizer-covered luster pigment particles. For example, it may contain particles such as pigment particles other than the plasticizer-covered luster pigment particles, or inorganic filler particles. Here, in a case where a component not present as particles is contained in the powder coating material, such a component is contained in the resin particles and/or plasticizer-covered luster pigment particles. The above-mentioned pigment particles other than the plasticizer-covered luster pigment particles, or inorganic filler particles, may likewise be contained in the resin particles and/or plasticizer-covered luster pigment particles.

Hereinafter, the luster pigment covered by the specific plasticizer may be referred to also as the "luster pigment Z".

According to the powder coating material of the present invention, it is possible to form a coating film which is excellent in weather resistance and wherein formation of color unevenness and pinholes is suppressed. Details of the reason for this have not yet been made clear, but they are presumed to be roughly as follows.

At the time of applying to a substrate a powder coating material comprising a powder component and a luster pigment, in which the luster pigment is adhered on the surface of the powder component, due to electrification of the powder coating material, the difference in electrification rate becomes remarkable between the powder component such as a powder resin and the luster pigment, whereby it becomes difficult to control the deposition rates of the powder component and the luster pigment to the substrate, i.e. the adhesion ratio between the powder component and the luster pigment adhered to the substrate, becomes different from the blend ratio between the powder component and the luster pigment contained in the powder coating material, whereby color unevenness tends to occur in the obtainable coating film.

To solve this problem, the present inventors have studied and as a result, have found it possible to suppress occurrence of color unevenness in the coating film by using the luster pigment Z. That is, the specific plasticizer in the present invention and the specific fluorinated copolymer in the present invention have a high affinity, and it is considered that due to the interaction that occurs between the luster pigment Z and the powder component containing the fluorinated copolymer, the luster pigment is firmly adhered on the surface of the powder component.

Thus, it is considered that it becomes easy to control the deposition ratio of the powder component and the luster pigment, and color unevenness in the obtainable coating film is suppressed.

On the other hand, as shown in Comparative Example 1 to be described later, in a case where a luster pigment having no plasticizer layer is used, even if the specific plasticizer is added at a timing of producing a powder coating material, the luster pigment will not be sufficiently adhered to the surface of the powder component, and color unevenness will be formed in the obtainable coating film. Further, in such a case, pinholes are likely to be formed in the coating film.

Pinholes in the coating film are considered to have formed due to the influence of the specific plasticizer added at the time of the production of the powder coating material. Whereas, according to the powder coating material of the present invention, the luster pigment Z is used, whereby it is considered possible to suppress formation of pinholes in the coating film.

Further, in order to improve the weather resistance of a coating film, a fluorinated polymer is used as a main component constituting the powder component, but depending on its type, there will be a phenomenon where the weather resistance is poor, or a phenomenon where the affinity to the specific plasticizer is poor, and it is not possible to suppress formation of color unevenness in the obtainable coating film. Such a phenomenon is also shown in Comparative Example 3 to be described later. Whereas, according to the powder coating material of the present invention, presumably because of the use of specific fluorinated copolymer, it is considered possible to form a coating film excellent in weather resistance without formation of color unevenness.

The powder component in the present invention contains a fluorinated copolymer having units Xa and units Xb, and having a fluorine content of at least 10 mass %.

The powder component is preferably curable, from such a viewpoint that the strength of the obtainable coating film will be superior.

The content (solid content) of the powder component is preferably from 20 to 99 mass %, more preferably from 30 to 97 mass %, to the total mass (solid content) of the powder coating material. When the content of the powder component is within the above range, formation of color unevenness in the obtainable coating film can further be suppressed, and the shielding properties of the coating film will be excellent. Here, the "solid content" is meant for a component not containing a solvent, etc. and capable of constituting the powder coating material (raw material for the powder coating material).

The average particle size of the powder component is not particularly limited and is preferably from 5 to 100 μm by a 50% average volume particle size distribution. The lower limit value is more preferably 15 μm. The upper limit value is more preferably 60 μm, further preferably 50 μm.

When the average particle size is at least 5 μm, it will be easy to uniformly mix the powder component and the luster pigment Z. Further, the cohesiveness of the powder component tends to be low, and at the time of coating, it will be easy to obtain a dust with a uniform size of the powder coating powder. Further, when the average particle size is at most 100 μm, the surface smoothness of the coating film will be good, and the outer appearance of the coating film will be excellent.

The average particle size of the powder component is obtainable by calculating a volume average from a particle size distribution measured by means of a known particle size distribution measuring device using a laser diffraction method as the measurement principle (e.g. manufactured by Sympatec, trade name "HELOS-RODOS").

The fluorinated copolymer in the present invention comprises units Xa and units Xb and has a fluorine content of at least 10 mass %.

Units Xa are repeating units derived from a fluoroolefin.

The fluoroolefin is a compound having one or more of hydrogen atoms in a hydrocarbon olefin substituted by fluorine atoms.

The number of carbon atoms in the fluoroolefin is preferably from 2 to 8, more preferably from 2 to 6.

The number of fluorine atoms in the fluoroolefin is preferably at least 2, more preferably from 3 to 4. When the number of fluorine atoms is at least 2, the coating film will be excellent in weather resistance.

In the fluoroolefin, one or more of hydrogen atoms not substituted by fluorine atoms may be substituted by chlorine atoms.

As the fluoroolefin, $CF_2=CF_2$, $CF_2CFCl$, $CF_2=CFCF_3$ or $CH_2=CF_2$ is preferred, and $CF_2=CF_2$ or $CF_2=CFCl$ is more preferred.

As units Xa, one type may be contained alone, or two or more types may be contained in combination.

The content of units Xa is preferably from 20 to 70 mol %, more preferably from 30 to 70 mol %, further preferably from 30 to 60 mol %, particularly preferably from 40 to 60 mol %, most preferably from 45 to 55 mol %, to all units which the fluorinated copolymer has. When the content of units Xa is at least the above lower limit value, the weather resistance of the coating film will be superior. When the content of units Xa is at most the above upper limit value, the fluorinated copolymer tends to be non-crystalline, and it is possible to form a coating film excellent in adhesion and surface smoothness.

Units Xb are repeating units derived from a monomer having no fluorine atom.

The content of units Xb is preferably from 30 to 80 mol %, more preferably from 30 to 70 mol %, further preferably from 30 to 40 mol %, particularly preferably from 40 to 60 mol %, most preferably from 45 to 55 mol %, to all units which the fluorinated copolymer has.

The monomer having no fluorine atom is not particularly limited and is preferably at least one fluorinated copolymer having no fluorine atom selected from the group consisting of a vinyl ether, an allyl ether, a vinyl ester, an allyl ester, an a-olefin and a (meth)acrylate, and from the viewpoint of improving the affinity to the specific plasticizer present at the surface of the luster pigment Z, a vinyl ether having no fluorine atom or a vinyl ester having no fluorine atom is more preferred, and a vinyl ether having no fluorine atom is particularly preferred.

As one preferred embodiment of the monomer having no fluorine atom, a monomer containing a cyclic hydrocarbon group in its side chain (hereinafter referred to also as a "monomer I") may be mentioned.

The cyclic hydrocarbon group is a hydrocarbon group having at least one cyclic structure.

The number of carbon atoms in the cyclic hydrocarbon group is not particularly limited, and is preferably from 4 to 20, more preferably from 5 to 10.

Specific examples of the cyclic hydrocarbon group may be monocyclic saturated hydrocarbon groups such as a cyclobutyl group, a cycloheptyl group, a cyclohexyl group, etc., double-cyclic saturated hydrocarbon groups such as 4-cyclohexylcyclohexyl group, etc., polycyclic saturated hydrocarbon groups such as 1-decahydronaphthyl group, 2-decahydronaphthyl group, etc., bridged cyclic saturated hydrocarbon groups such as a 1-norbornyl group, a 1-adamantyl group, etc., spiro hydrocarbon groups such as a spiro[3.4]octyl group, etc.

The monomer I is preferably a cycloalkyl vinyl ether, and cyclohexyl vinyl ether or 2-ethylhexyl vinyl ether is particularly preferred.

As the monomer I, one type may be used alone, or two or more types may be used in combination.

The content of units based on the monomer I is preferably from 9.5 to 70 mol %, more preferably from 20 to 60 mol %, further preferably from 30 to 50 mol %, to all units which the fluorinated copolymer has. If the content is at least the above lower limit value, it will be easy to adjust Tg of the fluorinated copolymer to be within a proper range, and it will be easy to produce the powder component. When the content is at most the above upper limit value, in the case of using another polymer which will be described later, the adhesion between the layer of the fluorinated copolymer and the layer of another polymer in the coating film will be excellent.

As another preferred embodiment of the monomer having no fluorine atom, a monomer containing a crosslinkable group (hereinafter referred to also as a "monomer II") may be mentioned. As will be described later in detail, in a case where the fluorinated copolymer has a crosslinkable group, by using a later-described curing agent in combination, a curable powder component can easily be prepared, and it will be possible to cure the coating film of the powder coating material to further improve the weather resistance, water resistance, chemical resistance, heat resistance, etc. In this specification, a monomer containing a crosslinkable group and a cyclic hydrocarbon group will be included in the above monomer II.

The crosslinkable group is preferably a functional group having active hydrogen (a hydroxy group, a carboxy group, an amino group, etc.), or a hydrolyzable silyl group (an alkoxysilyl group, etc.).

The monomer II is preferably a hydroxyalkyl vinyl ether (2-hydroxyethyl vinyl ether, 4-hydroxybutyl vinyl ether, cyclohexanedimethanol monovinyl ether, etc.), a hydroxyalkyl vinyl ester, a hydroxyalkyl allyl ether (hydroxyethyl allyl ether, etc.), a hydroxyalkyl allyl ester, or a hydroxyalkyl (meth)acrylate (hydroxyethyl (meth)acrylate, etc.), and from such a viewpoint that the weather resistance of a coating film to be formed will be excellent, a hydroxyalkyl vinyl ether is particularly preferred.

As the monomer II, one type may be used alone, or two or more types may be used in combination.

The content of units based on the monomer II is preferably from 0.5 to 20 mol %, more preferably from 1 to 15 mol %, to all units which the fluorinated copolymer has. When the content is at least the above lower limit value, in the case of using a later-described resin Y, the adhesion will be excellent between the layer of the resin Y and the layer of the fluorinated copolymer in the coating film. When the content is at most the above upper limit value, the coating film will be excellent in scratch resistance.

As another preferred embodiment of the monomer having no fluorine atom, a monomer having no cyclic hydrocarbon group and no crosslinkable group (hereinafter referred to also as a "monomer III") may be mentioned.

The monomer III may, for example, be an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.), an alkyl allyl ether (ethyl allyl ether, hexyl allyl ether, etc.), a vinyl ester of a carboxylic acid (acetic acid, butyric acid, pivalic acid, benzoic acid, propionic acid, etc.), an allyl ester of a carboxylic acid (acetic acid, butyric acid, pivalic acid, benzoic acid, propionic acid, etc.), ethylene, propylene, isobutylene, etc.

As the monomer III, one type may be used alone, or two or more types may be used in combination.

The content of units based on the monomer III is preferably from 0 to 50 mol %, more preferably from 5 to 45 mol %, further preferably from 15 to 40 mol %, to all units which the fluorinated copolymer has.

In the above, monomers capable of constituting units Xb have been exemplified, but besides them, for example, the fluorinated copolymer may contain units based on a macromonomer having no fluorine atom and having a hydrophilic group.

In the fluorinated copolymer in the present invention, the molar ratio of units Xa to units Xb (units Xa/units Xb) is preferably from 20/80 to 70/30, more preferably from 30/70 to 60/40, particularly preferably from 40/60 to 60/40.

Mn of the fluorinated copolymer is preferably from 3,000 to 50,000, more preferably from 5,000 to 30,000. If Mn of the fluorinated copolymer is at least the above lower limit value, the coating film will be excellent in water resistance and salt water resistance. When Mn of the fluorinated copolymer is at most the above upper limit value, the coating film will be excellent in surface smoothness.

The fluorine content of the fluorinated copolymer in the present invention is at least 10 mass %, preferably at least 15 mass %, more preferably at least 20 mass %, further preferably at least 25 mass %. Further, the fluorine content is preferably at most 80 mass %, more preferably at most 70 mass %. When the fluorine content of the fluorinated copolymer is at least 10 mass %, the coating film will be superior in weather resistance. When the fluorine content of the fluorinated copolymer is at most the above upper limit value, the coating film will be excellent in surface smoothness.

Accordingly, the fluorine content of the fluorinated copolymer is preferably from 10 to 80 mass %, more preferably from 15 to 80 mass %, further preferably from 20 to 70 mass %, particularly preferably from 25 to 70 mass %. Here, the fluorine content is usually calculated from the content of units Xa.

The SP value of the fluorinated copolymer in the present invention (hereinafter referred to also as "$SP_1$") is preferably from 16.0 to 20.0 $(J/cm^3)^{1/2}$, more preferably from 16.5 to 19.5 $(J/cm^3)^{1/2}$, further preferably from 17.0 to 19.0 $(J/cm^3)^{1/2}$.

The SP value is a value calculated by the following formula by the Fedors method.

(SP value)=$(\Delta H/V)^{1/2}$

In the formula, $\Delta H$ is the molar heat of vaporization (cal), and V is the molar volume (cm³). As $\Delta H$ and V, it is possible to use the sum of the molar heats of vaporization ($\Delta H$) and the sum of the molar volumes (V) of atomic groups described in "POLYMER ENGINEERING AND SCIENCE, Vol. 14, No. 2, 151-153 (1974)".

The SP values indicate that those having a small difference between the numerical values will be easily mixed with each other (compatibility is high), and those having a large difference in the numerical values will be hardly mixed with each other.

Tg of the fluorinated copolymer is preferably from 40 to 150° C., more preferably from 45 to 120° C., further preferably from 50 to 100° C. When Tg of the fluorinated copolymer is at least the above lower limit value, it will be easy to produce a powder coating material. When Tg of the fluorinated copolymer is at most the above upper limit value, the coating film will be excellent in surface smoothness.

As the fluorinated copolymer, a product commercially available as a powder coating material may be mentioned, and specifically, LUMIFLON 710, 710F (trade name, manufactured by Asahi Glass Company, Limited), ZEFFLE (trade name, manufactured by Daikin Industries, Ltd.), ZB-F1000 (trade name, manufactured by Dalian Zebon Co., Ltd.), Etafuron (trade name, manufactured by Eternal Corp.), or DS203 (trade name, manufactured by Dongyue Shenzhou Corp.), may be mentioned.

In the powder component in the present invention, a polymer containing no fluorine atom (hereinafter referred to also as "resin Y") may be contained, and it is preferred to contain at least one type of the resin Y selected from the group consisting of a polyester resin, a (meth)acrylic resin and an epoxy resin. When the powder component contains a resin Y, orientation of the luster pigment contained in the coating film becomes good, and the brightness (luster) of the coating film will be good.

The embodiment where the powder component in the present invention contains a resin Y, may be an embodiment containing particles of the fluorinated copolymer and particles of the resin Y, or an embodiment containing particles of a mixed resin containing the fluorinated copolymer and the resin Y, or it may take both embodiments. From such a viewpoint that surface smoothness of the coating film will be good, it is preferably an embodiment containing, at least in part, particles of a mixed resin containing the fluorinated copolymer and the resin Y.

The resin Y preferably satisfies the following relation with $SP_1$ from such a viewpoint that a coating film having a two-layer structure is readily obtainable wherein a layer composed mainly of the resin Y and a layer composed mainly of the fluorinated copolymer are laminated.

That is, the difference between $SP_1$ and the SP value of the resin Y (hereinafter referred to also as "$SP_2$") ($SP_2-SP_1$) is preferably more than 0, more preferably from 0.4 to 16 $(J/cm^3)^{1/2}$, particularly preferably from 2.0 to 12 $(J/cm^3)^{1/2}$.

When the difference between the above SP values is more than 0, at the time when the powder coating material is applied to a substrate to form a molten film made of a melt of the powder coating material, a molten fluorinated copolymer and a molten resin Y tend to be readily layer-separated. At that time, the layer of the resin Y tends to be disposed on the substrate side, and the layer of the fluorinated copolymer tends to be disposed on the air side.

When the difference between the above SP values is at most the above upper limit value, adhesion between the layer of the fluorinated copolymer and the layer of the resin Y in the coating film will be excellent.

Here, SP2 is preferably from 18.0 to 30.0 $(J/cm^3)^{1/2}$, more preferably from 18.5 to 29.5 $(J/cm^3)^{1/2}$, further preferably from 19.0 to 29.0 $(J/cm^3)^{1/2}$.

Further, in a case where two or more fluorinated copolymers are contained, the difference between the above SP values shall be obtained by taking the largest SP value as $SP_1$, among the SP values of the two or more fluorinated copolymers. Also, in a case where two or more resins Y are contained, the differences between $SP_2$ of the respective resins and $SP_1$ are obtained, and the respective differences preferably satisfy the above range.

As the resin Y, from such a viewpoint that the coating film will be excellent in adhesion to a substrate, or from such a viewpoint that the fluorinated copolymer will be less likely to be mixed in the layer formed by the resin Y, a polyester resin or a (meth)acrylic resin is preferred, and a polyester resin is particularly preferred.

In a case where the powder component contains a resin Y, the mass ratio of the content of the fluorinated copolymer to the content of the resin Y (content by mass of the fluorinated copolymer/content by mass of the resin Y) is preferably from 0.25 to 4, more preferably from 0.3 to 3.5, particularly preferably from 0.35 to 3. When the mass ratio is at least 0.25, the obtainable coating film will be superior in weather resistance. When the mass ratio is at most 4, the coating film will be superior in hydrochloric acid resistance, nitric acid resistance, shielding properties and weather resistance.

A polyester resin is a polymer having units derived from a polybasic carboxylic acid compound and units derived from a polyhydric alcohol compound, wherein the former units and the latter units are linked by ester bonds. The polyester resin may optionally have units derived from a hydroxycarboxylic acid compound (but excluding a polybasic carboxylic acid compound). The polyester resin preferably has a carboxy group or a hydroxy group at a terminal of the main chain.

The polybasic carboxylic acid compound may, for example, be phthalic acid, isophthalic acid, terephthalic acid, naphthalene dicarboxylic acid, trimellitic acid, pyromellitic acid, phthalic anhydride, etc., and from such a viewpoint that the coating film will be superior in weather resistance, isophthalic acid is preferred.

The polyhydric alcohol compound is, from such a viewpoint that adhesion between the coating film and the substrate, and flexibility of the coating film will be excellent, preferably an aliphatic polyhydric alcohol compound or an alicyclic polyhydric alcohol compound, more preferably an aliphatic polyhydric alcohol compound.

As the polyhydric alcohol compound, ethylene glycol, diethylene glycol, triethylene glycol, 1,2-propanediol, 1,3-propanediol, 1,3-butanediol, 1,4-butanediol, 1,5-pentanediol, neopentyl glycol, spiro glycol, 1,10-decanediol, 1,4-cyclohexanedimethanol, trimethylolethane, trimethylolpropane, glycerol, pentaerythritol, etc. may be mentioned.

The molecular weight of the polyester resin is, from such a viewpoint that the melt viscosity of the coating film can be made to be properly low, preferably such that Mn is at most 5,000 and Mw is from 2,000 to 20,000, particularly preferably such that Mn is at most 5,000 and Mw is from 2,000 to 10,000.

Specific examples of the polyester resin include "CRYLCOAT (registered trademark) 4642-3", "CRYLCOAT (registered trademark) 4890-0", manufactured by DAICEL- ALLNEX LTD., "U-PICA COAT (registered trademark) GV-250", "U-PICA COAT (registered trademark) GV-740", "U-PICA COAT (registered trademark) GV-175", manufactured by U-PICA Company, Ltd., "Uralac (registered trademark) 1680" manufactured by DSM Co., Ltd., etc.

A (meth)acrylic resin is a polymer having units based on a (meth)acrylate as the main units. In a case where the powder component contains a pigment other than the luster pigment as will be described later, from the viewpoint of dispersibility of such a pigment, the (meth)acrylic resin preferably has reactive groups such as carboxy groups, hydroxy groups, sulfo groups, etc. For example, in a case where the (meth)acrylic resin has carboxy groups, the acid value of the (meth)acrylic resin is preferably from 150 to 400 mgKOH/g.

Tg of the (meth)acrylic resin is preferably from 30 to 60° C. When Tg is at least the above lower limit value, the coating film will be excellent in blocking resistance. When Tg of the (meth)acrylic resin is at most the above upper limit value, the coating film will be superior in surface smoothness.

The molecular weight of the (meth)acrylic resin is, from the viewpoint of blocking resistance of the powder coating material and surface smoothness of the coating film, preferably such that Mn is from 30,000 to 100,000 and Mw is from 15,000 to 150,000.

Specific examples of the (meth)acrylic resin include "FINEDIC (registered trademark) A-249", "FINEDIC (registered trademark) A-251", "FINEDIC (registered trademark) A-266", manufactured by DIC Corporation, "ALMATEX (registered trademark) PD6200", "ALMATEX (registered trademark) PD7310", manufactured by Mitsui Chemicals, Inc., "SANPEX PA-55" manufactured by Sanyo Chemical Industries, Ltd., etc.

An epoxy resin is a compound (prepolymer) having two or more epoxy groups in the molecule. The epoxy resin may further have other reactive groups other than epoxy groups.

The epoxy resin may, for example, be a bisphenol A type epoxy resin, a bisphenol F type epoxy resin, etc.

Commercial products of the epoxy resin include "EPIKOTE (registered trademark) 1001", "EPIKOTE (registered trademark) 1002", "EPIKOTE (registered trademark) 4004P", manufactured by Mitsubishi Chemical Co., Ltd., "EPICLON (registered trademark) 1050", "EPICLON (registered trademark) 3050", manufactured by DIC Corporation, "Epotohto (registered trademark) YD-012", "Epotohto (registered trademark) YD-014", manufactured by Nippon Steel & Sum ikin Chemical Co., Ltd., "DENACOL (registered trademark) EX-711", manufactured by Nagase Chemtex Corporation, "EHPE3150", manufactured by Daicel Corporation, etc.

The powder component in the present invention preferably contains a pigment (hereinafter referred to also as "another pigment") other than the luster pigment with a view to coloring the coating film (imparting vividness to the coating film), to preventing corrosion or deterioration of the substrate, to adjusting the coating film properties (high hardness, processability, etc.), etc.

Another pigment may, for example, be an anticorrosive pigment, a coloring pigment, an extender pigment, etc.

As another pigment, one type may be used alone, or two or more types may be used in combination.

An anticorrosive pigment is a pigment for preventing corrosion or deterioration of a substrate which is required to have corrosion resistance. As such an anticorrosive pigment, a lead-free anticorrosive pigment which presents little impact on the environment is preferred. The lead-free anticorrosive pigment may, for example, be zinc cyanamide, zinc oxide, zinc phosphate, calcium magnesium phosphate, zinc molybdate, barium borate, zinc calcium cyanamide, etc.

A coloring pigment is a pigment for coloring the coating film. The coloring pigment may, for example, be quinacridone, diketopyrrolopyrrole, isoindolinone, indanthrone, perylene, perinone, anthraquinone, dioxazine, benzimidazolone, triphenylmethane quinophthalone, anthrapyrimidine, chrome yellow, phthalocyanine, a halogenated phthalocyanine, an azo pigment (azomethine metal complex, condensed azo, etc.), titanium oxide, carbon black, iron oxide, copper phthalocyanine, a condensed polycyclic pigment, etc.

In a case where titanium oxide is to be used as another pigment, such titanium oxide is preferably titanium oxide having subjected to surface treatment so that a photocatalytic reaction tends to hardly proceed, more preferably titanium oxide having subjected to surface treatment with an inorganic component (silica, alumina, zirconia, zirconia, selenium, selenium oxide, etc.) or an organic component (a polyol, etc.). More specifically, the titanium oxide is particularly preferably titanium oxide wherein the titanium oxide content is adjusted to be from 83 to 90 mass % by the above-mentioned surface treatment. When the titanium oxide content is at least the above lower limit value, the coating film will be excellent in whiteness. When the titanium oxide content is at most the above upper limit value, the coating film is less likely to be degraded.

As the component to be used in the surface treatment, zirconia or zirconium is preferred from the viewpoint of supplementing radical species to be generated from the titanium oxide. Specifically, the amount of zirconia or zirconium in 100 parts by mass of the surface-treated titanium oxide is preferably from 0.001 to 5.0 parts by mass, more preferably from 0.005 to 3.0 parts by mass, particularly preferably from 0. 01 to 1.0 parts by mass.

An extender pigment is a pigment to improve the hardness of the coating film and to increase the thickness of the coating film. Further, it is preferably used from such a viewpoint that in a case where a coated article such as an exterior building member is cut, the cut surface is to be maintained to be clean. As the extender pigment, talc, barium sulfate, calcium carbonate, etc. may be mentioned.

In a case where the powder component contains another pigment, the content of such another pigment is preferably from 0.1 to 30.0 mass %, more preferably from 0.5 to 25.0 mass %, particularly preferably from 1.0 to 20.0 mass %, to 100 mass % of the powder component.

The powder component in the present invention may contain a curing agent. Here, the curing agent is a compound having at least two functional groups, per molecule, which are reactive with the above-mentioned crosslinkable groups (hydroxy groups, carboxy groups, amino groups, alkoxysilyl groups, etc.).

In a case where the fluorinated copolymer contained in the powder component itself has crosslinkable groups, or in a case where a resin Y is contained, and the fluorinated copolymer or the resin Y has crosslinkable groups, when a curing agent is contained in the powder component, it will be easy to impart curability by a crosslinking reaction to the powder coating material. As a result, it will be easy to adjust the physical properties such as the coating film hardness in the formation of the coating film.

The softening temperature of the curing agent is preferably from 10 to 120° C., more preferably from 40 to 100° C. When the softening temperature is at least the above lower limit value, it will be easy to suppress curing at room temperature of the powder component, whereby coarsening of the powder component can be prevented. When the softening temperature is at most the above upper limit value, it will be easy to homogeneously disperse the curing agent in the powder component.

The curing agent may suitably be selected depending on the type of the crosslinkable groups which the fluorinated copolymer or the resin Y has, and a blocked isocyanate-type curing agent, an amine-type curing agent (melamine resin, guanamine resin, sulfonamide resin, urea resin, aniline resin, etc.), a β-hydroxyalkylamide-type curing agent, or an epoxy-type curing agent (triglycidyl isocyanurate, etc.) may be mentioned.

For example, in a case where the crosslinkable groups are hydroxy groups, the curing agent is preferably a blocked isocyanate-type curing agent from such a viewpoint that adhesion between the coating film and the substrate, processability of the coated product, and water resistance of the coating film, will be excellent. In a case where the crosslinkable groups are carboxy groups, the curing agent is preferably a β-hydroxyalkylamide-type curing agent, or an epoxy-type curing agent.

As the curing agent, one type may be used alone, or two or more types may be used in combination.

As the blocked isocyanate-type curing agent, preferred is a curing agent which is solid at room temperature, and a curing agent is preferred which is obtained by reacting a diisocyanate with a low molecular weight compound having active hydrogen to obtain a polyisocyanate, which is further reacted with a blocking agent for masking.

The diisocyanate may, for example, be tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl)cyclohexane isophorone diisocyanate, dimer acid diisocyanate, lysine diisocyanate, etc.

The low molecular weight compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester containing hydroxy groups, polycaprolactone, etc.

The blocking agent may, for example, be an alcohol (methanol, ethanol, benzyl alcohol, etc.), a phenol (phenol, cresol, etc.), a lactam (caprolactam, butyrolactam, etc.), or an oxime (cyclohexanone, oxime, methyl ethyl ketoxime, etc.).

The content (solid content) of the curing agent is, to 100 parts by mass (solid content) of the total amount of the resin component in the powder component, preferably from 0.1 to 50.0 parts by mass, more preferably from 1.0 to 40.0 parts by mass. When the amount of the curing agent to be added is within the above range, the above-mentioned effects of the curing agent tend to be easily obtained.

The powder component in the present invention may contain a curing catalyst.

The curing catalyst is a component to accelerate the crosslinking reaction in a case where a curing agent is contained, and for example, in a case where a blocked isocyanate-type curing agent is to be used as the curing agent, it is preferred to use a tin catalyst (tin octylate, tributyltin laurate, dibutyltin dilaurate, etc.).

As the curing catalyst, one type may be used alone, or two or more types may be used in combination.

The amount (solid content) of the curing catalyst to be added is, to 100 parts by mass (solid content) of the amount of the curing agent to be added, preferably from 0.000001 to 0.001 part by mass.

The powder component in the present invention may, if necessary, further contain other optional components.

Other optional components may, for example, be ultraviolet absorbers (various organic ultraviolet absorbers, inorganic ultraviolet absorbers, etc.), light stabilizers (hindered amine light stabilizers, etc.), matting agents (micronized synthetic silica, etc.), leveling agents, surface conditioners (to improve the surface smoothness of the coating film), degassing agents, fillers, heat stabilizers, thickeners, dispersing agents, antistatic agents, silane coupling agents, soil release agents, low pollution treatment agents, etc.

As a method for producing the powder component in the present invention, the following method may be mentioned.

First, the fluorinated copolymer and, as the case requires, the resin Y, another pigment, a curing agent, a curing catalyst and other additives, are dry-blended by means of a mixer or a blender, and then, the mixture is melt-kneaded at from 80 to 120° C. by using a kneader.

Then, the melt-kneaded product thus obtained is cooled by a cooling roll or a cooling conveyor to obtain a solidified product of the melt-kneaded product. Next, the solidified product is pulverized by using a pulverizer, etc. In the pulverization, via a stepwise pulverization process comprising coarse pulverization, fine pulverization, etc., the solidified product is pulverized to a desired particle size. Next, by a method of classifying the pulverized product by an air classifier, it is possible to produce a desired powder component.

Further, the powder component may be produced by a method other than the above method, for example by a spray drying method or a polymerization method.

The luster pigment Z in the present invention comprises luster pigment particles and a plasticizer layer disposed on the surface of the luster pigment particles. The luster pigment Z in the present invention is a pigment which is capable of imparting luster to a coating film obtainable from the powder coating material.

The luster pigment Z may be a plasticizer-covered luster pigment consisting of luster pigment particles having a synthetic resin layer as described later between the luster pigment particle surface and the plasticizer layer. A particle portion excluding the plasticizer layer in the luster pigment particle having no synthetic resin layer, and a particle portion excluding the plasticizer layer in the luster pigment Z having a synthetic resin layer, will be hereinafter referred to also as a "substrate particle". The substrate particle may be a particle which is surface-treated by a surface treating agent other than the synthetic resin (e.g. by a silane coupling agent, etc.).

The content of the substrate particles is, to 100 parts by mass of the content of the above powder component, preferably from 0.01 to 30 parts by mass, more preferably from 0.05 to 25.0 parts by mass, particularly preferably from 0.1 to 20.0 parts by mass. When the content of the substrate particles is at least the above lower limit value, not only it is possible to further suppress formation of color unevenness in the obtainable coating film, but also shielding properties of the coating film will be excellent. When it is at most the above upper limit value, orientation of the substrate particles in the obtainable coating film will be good, and luster (brightness) will be excellent.

The average particle size of the substrate particles is preferably from 5 to 100 μm, more preferably from 8 to 45

μm, in a 50% average volume particle size distribution. When the average particle size of the substrate particles is at least the above lower limit value, shielding properties of the coating film will be superior. When the average particle size of the substrate particles is at most the above upper limit value, luster (color tone) of the coating film will be superior. The average particle size of the substrate particles may be measured by the same method as the particle size of the powder component.

In the following, the material to constitute the luster pigment Z in the present invention will be described.

The substrate particles in the present invention are preferably metal particles (a metal such as aluminum, zinc, copper, bronze, nickel or titanium, or an alloy such as bronze or stainless steel), mica particles (mica powder), pearl particles, graphite particles, glass flakes, or scaly iron oxide particles, and from such a viewpoint that it is possible to form a coating film excellent in luster, and handling efficiency will be excellent, metal particles, mica particles or pearl particles are preferred, and aluminum particles, mica particles or pearl particles are particularly preferred. As the substrate particles, one type may be used alone, or two or more types may be used in combination. In the present specification, a luster pigment wherein metal particles are used as the substrate particles, is sometimes referred to as a metallic pigment.

The shape of the substrate particles is not particularly limited, and it is preferably scaly (flaky). For example, scaly aluminum particles are not only excellent in metallic luster, but also they are easy to handle since the specific gravity is small.

In a case where the substrate particles are scaly, their average aspect ratio is preferably from 10 to 300, more preferably from 50 to 200. The "aspect ratio" means the ratio of the maximum length to the thickness (maximum length/thickness) of the substrate particles, and the "average aspect ratio" is the average value of the aspect ratios of 50 substrate particles selected randomly. The thickness of the substrate particles is measured by an atomic force microscope, and the maximum length of the substrate particles is measured by a transmission electron microscope.

The plasticizer layer in the luster pigment Z contains a specific plasticizer to be described later, and it is disposed (formed) on the substrate particles. The plasticizer layer is formed as the outermost layer of the luster pigment Z.

The plasticizer layer being disposed on the substrate particles includes not only an embodiment wherein a plasticizer layer is disposed directly on the substrate particles, but also an embodiment wherein a plasticizer layer is disposed via another material (e.g. a later-described synthetic resin layer).

The plasticizer layer may be formed (adhered) on at least part of the substrate particles, or it may be formed (adhered) on the entire surface of the substrate particles.

The specific plasticizer has a melting point of from 30 to 200° C. and a molecular weight of from 200 to 1,000, and has from 1 to 4 ester groups per molecule.

The melting point of the specific plasticizer in the present invention is from 30 to 200° C., preferably from 60 to 180° C., more preferably from 65 to 160° C., particularly preferably from 65 to 140° C.

When the melting point is at least the lower limit value in the above range, not only blocking of the powder coating can be suppressed, but also the surface of particles constituting the powder component will be softened, whereby the luster pigment Z tends to readily adhere to the surface of the powder component.

When the melting point of the specific plasticizer is at most the upper limit value in the above range, formation of coating film pinholes due to the plasticizer is less likely to occur during the heat curing at the time of forming a coating film, and further, orientation of the luster pigment will be improved at the time of forming the coating film.

The molecular weight of the specific plasticizer is from 200 to 1,000, preferably from 220 to 980, particularly preferably from 240 to 960.

When the molecular weight of the specific plasticizer is at least the above lower limit value, the volatility of the plasticizer becomes low, and the melt viscosity of the molten film tends to be low, whereby the coating film excellent in surface smoothness can be easily obtained. When the molecular weight is at most the above upper limit value, excessive expression of plasticizing effects will be suppressed, and the powder coating material will be excellent in blocking resistance.

The specific plasticizer has from 1 to 4 ester groups (—C(=O)O—) per molecule, and a compound having from 2 to 4 ester groups is preferred.

When the number of ester groups which the specific plasticizer has, is at least 1, the affinity between the fluorinated copolymer and the plasticizer contained in the powder component will be improved, and the luster pigment Z tends to readily adhere to the surface of the powder component.

Further, when the number of ester groups in the specific plasticizer is at most 4, it is possible to suppress excessive affinity between the powder component and the luster pigment Z, and to suppress bleeding out of the plasticizer to the surface of the coating film.

The specific plasticizer preferably further has a cyclic hydrocarbon group. The cyclic hydrocarbon group may be an alicyclic hydrocarbon group or may be an aromatic hydrocarbon group.

When the plasticizer has a cyclic hydrocarbon group, the affinity between the fluorinated copolymer and the plasticizer contained in the powder component will be further improved, and the luster pigment Z tends to be readily adhered to the surface of the powder component. Further, it is possible to further suppress bleeding out of the plasticizer. Furthermore, it is possible to suppress thermal decomposition or photodegradation of the plasticizer in the coating film.

The specific plasticizer may, for example, be dicyclohexyl phthalate (melting point: 68° C., molecular weight: 330), tri-benzoic acid glyceride (melting point: 68° C., molecular weight: 404), tetrabenzoic acid pentaerythritol (melting point: 108° C., molecular weight: 552), 1,4-cyclohexane dimethanol dibenzoate (melting point: 118° C., molecular weight: 352), etc.

As the specific plasticizer, one type may be used alone, or two or more types may be used in combination.

In the luster pigment Z, the adhesion amount of the specific plasticizer to the luster pigment particles is, to 100 parts by mass of the content the luster pigment particles (substrate particles) before being covered by the plasticizer, preferably from 0.01 to 10.0 parts by mass, more preferably from 0.05 to 8.0 parts by mass, particularly preferably from 0.1 to 5.0 parts by mass. When the adhesion amount is at least the above lower limit value, since the plasticizer is sufficiently deposited on the substrate particles, the affinity between the fluorinated copolymer and the plasticizer contained in the powder component becomes better. When the adhesion amount is at most the above upper limit value, it is possible to suppress excessive affinity between the powder component and the luster pigment, and it is possible to suppress bleeding out of the plasticizer.

Here, the adhesion amount of the specific plasticizer to the substrate particles is, if quantifiable by drawing a calibration curve based on the infrared spectrum (IR spectrum) detected by a Fourier transform infrared spectroscopy (FTIR), calculated on the basis of the quantification. On the other hand, in a case where it is difficult to calculate the adhesion amount of the plasticizer to the substrate particles based on the IR spectrum, the adhesion amount of the specific plasticizer to the substrate particles, is calculated from the charged amounts of the substrate particles and the plasticizer.

As a method of letting the specific plasticizer be adhered to the substrate particles, the following method may be mentioned. In a case where a synthetic resin layer to be described later is formed on the surface of the substrate particles, a plasticizer layer is formed on the surface of the synthetic resin layer.

First, the specific plasticizer is dissolved in an organic solvent (such as tetrahydrofuran) to prepare a solution. The content of the plasticizer in the solution is, for example, preferably from 1 to 50 mass %.

Then, the solution and the substrate particles are mixed and stirred to obtain a mixed solution containing the substrate particles and the plasticizer. Conditions in the stirring and mixing are not particularly limited, and may be suitably adjusted depending upon the device to be used.

The addition amount of the specific plasticizer is not particularly limited, and may be similar to the ratio described for the adhesion amount of the specific plasticizer to the substrate particles.

Then, the organic solvent is removed from the above mixed solution, to obtain a luster pigment (i.e. luster pigment Z) comprising substrate particles and a plasticizer layer disposed on the substrate particles. The method for removing the organic solvent is not particularly limited so long as it is a method whereby the organic solvent can be sufficiently removed, and a reduced pressure distillation, etc., may be mentioned.

In a case where the substrate particles have a synthetic resin layer, as such a synthetic resin, at least one synthetic resin selected from the group consisting of (meth)acrylic resins, epoxy resins, silicone resins, polyester resins, fluororesins, terpene resins, terpene phenol resins, hydrogenated terpene resins and hydrogenated terpene phenol resins, is preferred.

As the luster pigment consisting of substrate particles having a synthetic resin layer formed, it is also possible to use a commercially available product, and it is possible to use a luster pigment consisting of aluminum particles having a synthetic resin layer adhered, such as trade name "PCU1000", "PCU2000", "PCA9155", "PCR901" (manufactured by ECKART), "PCF7620A", "PCF7601A", "PCF7130A" "0100M", "7620NS" (manufactured by Toyo Aluminum K.K.), etc.

The adhesion amount of the synthetic resin to the substrate particles is preferably at least 2 parts by mass, more preferably at least 5 parts by mass, to 100 parts by mass of the substrate particles. The upper limit value for the adhesion amount is preferably 50 parts by mass.

When the adhesion amount is at least 2 parts by mass, weather resistance of the obtainable coating film will be superior, and chemical resistance, etc. of the coating film will be good. Further, when the adhesion amount is at most 50 parts by mass, adhesion between the powder component and the luster pigment Z will be superior.

The SP value of the synthetic resin (hereinafter referred to also as "SPb") is, from such a viewpoint that weather resistance of the coating film will be superior, preferably larger than $SP_1$ and smaller than SP2 ($SP_1<SP_b<SP2$). By using such a luster pigment Z having a synthetic resin layer having this SP value, the luster pigment tends to be localized at the interface between the layer of the resin Y and the layer of the fluorinated copolymer which underwent double layer separation, and readily be oriented substantially in parallel to the substrate. Thus, orientation of the luster pigment in the present coating film will be good, and the present coating film will be improved in no formation of color unevenness, color tone and shielding properties. Furthermore, the present coating film will be improved also in weather resistance.

The $SP_b$ of the synthetic resin is preferably from 16.0 to 28.0 $(J/cm^3)^{1/2}$, more preferably from 17.0 to 27.0 $(J/cm^3)^{1/2}$, particularly preferably from 18 to 26.0 $(J/cm^3)^{1/2}$.

The powder coating material of the present invention may further contain, as components other than the powder component and the luster pigment Z, components contained in a conventional powder coating material, as the case requires.

The powder coating material of the present invention preferably contains a powder component having a luster pigment Z adhered to the surface.

The average particle size of the powder coating material (50% average volume particle size distribution) is substantially the same as the average particle size of the above-described powder component and is preferably from 5 to 100 μm. The lower limit value is more preferably 15 μm. The upper limit value is more preferably 60 μm, further preferably 50 μm.

The average particle size of the powder coating material is measured by the same method as the above-described powder component.

In the method for producing a powder coating material of the present invention, it is preferred that the powder component and the luster pigment Z are mixed at a temperature below 50° C., to let the luster pigment Z be adhered to the surface of the powder component (an embodiment of a dry blending method). Thus, it is possible to obtain a powder coating material capable of forming a coating film excellent in weather resistance and having formation of color unevenness and pinholes suppressed.

According to the method of producing a powder coating material of the present invention, even at a temperature below 50° C. i.e. lower than the temperature for mixing the pigment and the powder coating material in a conventional dry blending method, it is possible to let the luster pigment Z be sufficiently adhered on the surface of the powder component, and to suppress formation of fine irregularities so-called orange peel or rough skin on the surface of a coating film to be formed by using the obtained powder coating material.

The reason is not yet clearly understood, but is considered to be roughly as follows.

That is, by the action of the plasticizer layer contained in the luster pigment Z, even at a temperature below 50° C., it is considered possible to let the luster pigment Z be well adhered to the surface of the powder component.

On the other hand, in the conventional dry blending method, the pigment and the powder coating material are usually mixed at a temperature of at least 50° C. However, as a result of a study made by the present inventors, it has been found that by the heating temperature and frictional heat among the respective components, some of the fluorinated copolymer will be crosslinked to form orange peel on the surface of the resulting coating film. Against this problem, by setting the mixing temperature to be below 50° C., presumably it has been made possible to suppress crosslinking of the fluorinated copolymer thereby to suppress formation of orange peel.

In the following, the method for producing a powder coating material of the present invention will be described in detail.

A known mixing apparatus may be used for mixing the powder component and the luster pigment Z, i.e. the mixing may be carried out by using a high-speed mixer, a double cone mixer, a kneader, a tumbler mixer, a mixing shaker, a drum shaker, a rocking shaker, etc.

The temperature during the mixing of the powder component and the luster pigment Z is below 50° C., preferably at least 10° C. and below 50° C., particularly preferably from 15 to 45° C. When the temperature during the mixing is below 50° C., it is possible to suppress cross-linking of the fluorinated copolymer, and it is possible to suppress formation of orange peel on the surface of the coating film. On the other hand, when it is at least 10° C., it is possible to let the luster pigment Z be well adhered to the surface of the powder component.

The time for the mixing of the powder component and the luster pigment Z is preferably from 0.5 to 24 hours, particularly preferably from 1.0 to 10.0 hours. When the mixing time is within the above range, it is possible to let the luster pigment Z be well adhered to the surface of the powder component.

The pressure in the mixing of the powder component and the luster pigment Z is not particularly limited, and a pressure in the vicinity of the standard pressure (101325 Pa) is preferred from such a viewpoint that the adhesion strength of the luster pigment Z to the powder component will be proper, and orientation of the luster pigment in the coating film will be improved.

The powder coating material obtained by the production method of the present invention may further be subjected to classification treatment. For the classification treatment, a sieving method, an air classification method, etc. may be used.

The coated article of the present invention comprises a substrate and a coating film formed on the substrate by the above-described powder coating material.

The material of the substrate is not particularly limited, and inorganic material, organic material, organic-inorganic composite material, etc. may be mentioned. The inorganic material may, for example, be concrete, natural stone, glass, metal (iron, stainless steel, aluminum, copper, brass, titanium, etc.), etc. The organic material may, for example, be plastic, rubber, adhesive, wood, etc. The organic-inorganic composite material may, for example, be fiber-reinforced plastic, resin-reinforced concrete, fiber-reinforced concrete, etc.

Further, the substrate may be one subjected to known surface treatment (e.g., chemical treatment, etc.).

As the material of the substrate, a metal is preferred, and aluminum is particularly preferred. An aluminum substrate is excellent in corrosion resistance, light in weight and suitable for an application to building material, such as an exterior member.

The shape, size, etc. of the substrate are not particularly limited.

Specific examples of the substrate include composite panels, curtain wall panels, frames for curtain walls, exterior members for buildings such as window frames, automotive members such as tire wheels, construction machinery, frames of motorcycles, etc.

The water contact angle at the surface of the coating film is preferably from 1 to 55 degrees, more preferably from 3 to 50 degrees. When the water contact angle is at least the above lower limit value, the coating film is less likely to be eroded by an organic acid component derived from feces of birds or dead insects, and formation of mold at the surface of the coating film can be suppressed (formation of mold is likely to lead to poor outer appearance). When the water contact angle is at most the above upper limit value, the stain resistance will be excellent.

The water contact angle is measured by using, for example, "DM-051" (trade name) manufactured by Kyowa Interface Science Co., Ltd.

The thickness of the coating film is not particularly limited but is preferably from 20 to 1,000 μm, more preferably from 20 to 500 μm, further preferably from 20 to 300 μm. In an application to e.g. a member of a high-rise building, such as an aluminum curtain wall, etc., from 20 to 90 μm is preferred. In an application where the requirement for weather resistance is high, such as an outdoor unit of an air conditioner installed on the coast, a pole, signs, etc. for traffic signals, from 100 to 200 μm is preferred.

Although not limited thereto, the method for producing a coated article of the present invention is preferably a method wherein the powder coating material of the present invention is applied to a substrate, to form a molten film made from a melt of the powder coating material, and then, the molten film is cooled to form a coating film.

In the formation of a molten film, the powder coating material of the present invention is applied to a substrate to form a molten film made from a melt of the powder coating material on the substrate.

The molten film made from a melt of the powder coating material may be formed at the same time as the application of the powder coating material to the substrate, or may be formed by heating and melting the powder coating material on the substrate after depositing the powder coating material to the substrate.

The heating temperature and heating retention time for heating and melting the powder coating material and for maintaining the molten state for a predetermined time, are suitably set depending upon the type and composition of the raw material components of the powder coating material, the thickness, etc. of the desired coating film. The heating temperature is usually from 120 to 300° C., and the heating retention time is usually from 2 to 60 minutes.

The coating method may be a known method such as a static coating method, an electrostatic spraying method, an electrostatic dipping method, a misting method, a flow immersion method, a blowing method, a spraying method, a thermal spraying method, a plasma spraying method, etc.

From such a viewpoint that even when the molten film is thinned, the molten film will be excellent in surface smoothness and further, the coating film will be superior in shielding properties, an electrostatic coating method using a powder coating gun is preferred.

The powder coating gun may be a corona charging type spray gun or a friction charging type spray gun. The corona charging type spray gun is a spray gun for spraying a powder coating material by corona discharge treatment, and the friction charging type spray gun is a spray gun for spraying a powder coating material by frictional charge treatment.

In the formation of the coating film, the molten film in the molten state is cooled to room temperature (20 to 25° C.) to form a coating film.

The cooling after baking may be either quenching or annealing, but annealing is preferred in that the coating film is less likely to peel from the substrate.

Further, other coating conditions are selected from known conditions depending upon components contained in the powder coating material.

EXAMPLES

In the following, the present invention will be described in detail with reference to Examples. However, the present invention is not limited to these Examples. Further, blend amounts of the respective components in Tables given later are based on mass.

[Materials Used]

The materials used in Examples and Comparative Examples are shown below.

[Fluorinated Copolymers]

Fluorinated copolymer 1: A fluorinated copolymer obtained in the following Production Example (hydroxy value: 50 mgKOH/g, fluorine content: 25 mass %, Tg: 51° C., Mn: 120,000, a copolymer of $CF_2=CFCl$, cyclohexyl vinyl ether and hydroxybutyl vinyl ether, wherein the contents of the respective units are 50 mol %, 35 mol % and 15 mol %, respectively).

Fluorinated copolymer 2: Manufactured by Sino-Rich, product name "Richflon SRF-750P" (hydroxy value: 54 mgKOH/g, fluorine content: 22 mass %, Tg: 41.3° C., a copolymer of $CF_2=CFCl$, hydroxyethyl allyl ether, vinyl versatate and vinyl acetate, wherein the contents of the respective units are 43 mol %, 11 mol %, 10 mol % and 36 mol %, respectively).

PVDF: Manufactured by Shenzhou New Material Co., Ltd. (Dongyue), product name "PVDF DS203", (Mw: 270,000, Mn: 160,000, melting point: 170.0° C., melt viscosity at 190° C.: 3,100 Pa·s, a homopolymer of $CH_2=CF_2$, hydroxy value: 0 mgKOH/g).

[Resin Y]

Polyester resin: Manufactured by DAICEL-ALLN EX LTD., CRYLCOAT (registered trademark) 4890-0, Mn: 2500, softening point: 120° C.

(Meth)acrylic resin: Manufactured by Dow Chemical, trade name: Paraloid B-44

[Other Pigment]

Titanium oxide: Manufactured by DuPont, Ti-Pure (registered trademark) R960, titanium oxide content: 89 mass %.

[Plasticizers]

Plasticizer 1: 1,4-cyclohexanedimethanol dibenzoate (manufactured by Eastman Chemical Company, Benzoflex (registered trademark) 352, melting point: 118° C., molecular weight: 352).

Plasticizer 2: tetrabenzoic acid pentaerythritol (manufactured by Tokyo Chemical Industry Co., Ltd., melting point: 108° C., molecular weight: 552).

[Other Components]

Curing agent: A blocked isocyanate-type curing agent (manufactured by Evonik, VESTAGON (registered trademark) B1530).

Curing catalyst: A dibutyl tin dilaurate solution in xylene (10,000-fold diluted product).

Degassing agent: Benzoin.

Surface conditioner A: Manufactured by BYK-Chemie GmbH, BYK (registered trademark)-360P.

Surface conditioner B: Manufactured by BYK-Chemie GmbH, CERAFLOUR (registered trademark) 960, Micronized modified amide wax, melting point: 145° C.

[Luster Pigments]

Luster pigment 1: Aluminum powder having the surface covered with an acrylic resin (product name "PCF7620A", manufactured by Toyo Aluminum K.K.).

Luster pigment 2: Aluminum powder (manufactured by Toyo Aluminum K.K.)

[Production Example of Fluorinated Copolymer]

Into a stainless steel autoclave equipped with a stirrer and having an inner volume of 250 mL, 51.2 g of cyclohexyl vinyl ether, 13.3 g of 4-hydroxybutyl vinyl ether, 55.8 g of xylene, 15.7 g of ethanol, 1.1 g of potassium carbonate, 0.7 g of a 50 mass % xylene solution of tert-butyl peroxypivalate (polymerization initiator) and 63.0 g of $CF_2=CFCl$ were introduced. Then, the mixture was gradually heated, and after reaching 55° C., held for 20 hours. Then, the mixture was heated to 65° C. and held for 5 hours. Thereafter, the mixture was cooled and subjected to filtration to remove the residue and to obtain a fluorinated copolymer 1.

[Production Example of Luster Pigment Z1]

3.5 g of plasticizer 1 and 31.5 g of tetrahydrofuran were mixed and thoroughly stirred to prepare a solution containing 10 mass % of plasticizer 1.

Then, into a three-necked flask having a capacity of 100 ml and equipped with a thermometer, a stirrer and a dropping funnel, 15 g of luster pigment 1 was introduced, and while stirring at 100 rpm, in a room temperature atmosphere, 35.0 g of the above-mentioned solution was dropwise added at a constant rate over 10 minutes to prepare a mixture of luster pigment 1 and plasticizer 1.

The mixture was stirred and mixed at room temperature for 1 hour at 100 rpm, and then under vacuum (10 mmHg), tetrahydrofuran was removed from the mixture, to obtain a luster pigment Z1 having a layer of plasticizer 1 provided on the surface of aluminum powder (aluminum particles) covered with an acrylic resin.

As a result of confirming the surface of the luster pigment Z1 by IR measurement, the presence of 1,4-cyclohexane dimethanol dibenzoate was confirmed on the surface of aluminum powder (aluminum particles) covered with an acrylic resin.

[Production of Luster Pigment Z2]

In the same manner as Production Example of luster pigment Z1 except for using pllasticizer 2 in place of plasticizer 1, luster pigment Z2 having a layer of plasticizer 2 provided on the surface of aluminum powder (aluminum particles) covered with an acrylic resin, was obtained.

As a result of confirming the surface of luster pigment Z2 by IR measurement, the presence of tetra-benzoic acid pentaerythritol was confirmed on the surface of aluminum powder (aluminum particles) covered with an acrylic resin.

[Production Example of Powder Component 1]

17.2 parts by mass of the fluorinated copolymer 1, 40.1 parts by mass of the polyester resin, 17.2 parts by mass of titanium oxide, 18.4 parts by mass of the curing agent, 0.1 part by mass of the curing catalyst, 0.5 part by mass of the degassing agent, 1.0 part by mass of the surface conditioner A, 2.0 parts by mass of the surface conditioner B and 3.5 parts by mass of the plasticizer 1 were put in a high speed mixer and mixed with stirring for 1 minute, to obtain a mixture. Then, the above mixture was kneaded by using a twin screw kneader (manufactured by Prism) having a temperature adjusted to 120° C., and a discharged kneaded product was cold-rolled by a cooling roll. The resulting stretched plate-like mixture was roughly crushed and further pulverized by using a pin mill, followed by classification by a net with 100 μm mesh opening to obtain a powder component 1.

[Production Example of Powder Component 2]

A powder component 2 was obtained in the same manner as in Production Example of the powder component 1 except that the fluorinated copolymer 2 was used in place of the fluorinated copolymer 1.

[Production Example of Powder Component 3]

70.0 parts by mass of PVDF, 30.0 parts by mass of the acrylic resin, 40.0 parts by mass of the titanium oxide pigment, 0.4 part by mass of the degassing agent, 1.0 part by mass of the surface conditioner A, and 2.0 g of the surface conditioner B were put in a high speed mixer and mixed with stirring for 1 minute, to obtain a mixture. Then, the above mixture was kneaded by using a twin screw kneader (manufactured by Prism) having a temperature adjusted to 190° C., and a discharged kneaded product was cold-rolled by a cooling roll. The resulting stretched plate-like mixture was roughly crushed and further pulverized by using a pin mill, followed by classification by a net with 100 μm mesh opening to obtain a powder component 3.

[Production Examples of Powder Coating Materials]

Ex. 1

Into a three-necked flask having a capacity of 500 ml and equipped with a thermometer, a stirrer and a dropping funnel, 100 parts by mass of the powder component 1 and 5 parts by mass of the luster pigment Z1 were introduced, and while stirring the mixture at 100 rpm, the mixture was warmed to 45° C. in a room temperature atmosphere, and further mixed with stirring for 1 hour to obtain a powder coating material 1.

The particle surface of the powder coating material 1 was observed by a scanning electron microscope (manufactured by JEOL Ltd. "JSM-5900LV", 20 kV, 10,000 magnifications, the same applies hereinafter), and as a result, adhesion of the luster pigment Z1 on the surface of particles of the powder component 1 was confirmed.

Ex. 2

A powder coating material 2 was obtained by the same production method as for the powder coating material 1 except that the heating condition was changed from 45° C. to 30° C.

The particle surface of the powder coating material 2 was observed by a scanning electron microscope, and as a result, adhesion of the luster pigment Z1 on the surface of particles of the powder component 1 was confirmed.

Ex. 3

A powder coating material 3 was obtained by the same production method as for the powder coating material 1 except that the luster pigment Z1 was changed to the luster pigment Z2.

The particle surface of the powder coating material 3 was observed by a scanning electron microscope, and as a result, adhesion of the luster pigment Z2 on the surface of particles of the powder component 1 was confirmed.

Ex. 4

A powder coating material 4 was obtained by the same production method as for the powder coating material 1 except that the powder component 1 was changed to the powder component 2.

The particle surface of the powder coating material 4 was observed by a scanning electron microscope, and as a result, adhesion of the luster pigment Z1 on the surface of particles of the powder component 3 was confirmed.

Ex. 5

A powder coating material 5 was obtained by the same production method as for the powder coating material 1 except that the heating condition was changed from 45° C. to 55° C.

The particle surface of the powder coating material 5 was observed by a scanning electron microscope, and as a result, adhesion of the luster pigment Z1 on the surface of particles of the powder component 1 was confirmed, but a number of agglomerates formed by agglomeration of the powder component 1 were also observed.

Ex. 6

Into a three-necked flask having a capacity of 500 ml and equipped with a thermometer, a stirrer and a dropping funnel, 100 parts by mass of the powder component 1, 5 parts by mass of the luster pigment 1 and 3.5 parts by mass of the plasticizer 1 were introduced, and while stirring the mixture at 100 rpm, the mixture was warmed to 45° C. in a room temperature atmosphere and further mixed with stirring for 1 hour to obtain a powder coating material c1.

The particle surface of the powder coating material c1 was observed by a scanning electron microscope, and as a result, adhesion of the luster pigment 1 on the surface of particles of the powder component 1 was confirmed.

Ex. 7

35.0 parts by mass of the fluorinated copolymer 1, 35.0 parts by mass of the polyester resin, 0.5 part by mass of titanium oxide, 20.0 parts by mass of the curing agent, 5.0 parts by mass of the surface conditioner A and the luster pigment 1 were charged into a high speed mixer and mixed for 1 minute to obtain a mixture.

Thereafter, the above mixture was kneaded by means of a twin screw kneader (manufactured by Prism) having a temperature adjusted to 120° C., and a discharged kneaded product was cold-rolled by a cooling roll, whereupon the resulting extended plate-like mixture was crushed and further pulverized by means of a pin mill, followed by classification by a net with 100 μm mesh opening to obtain a powder coating material c2 of Comparative Example 2.

Ex. 8

A powder coating material c3 was obtained by the same production method as for the powder coating material in Example 1 except that the powder component 1 was changed to the powder component 2.

The particle surface of the powder coating material c3 was observed by a scanning electron microscope, and as a result, adhesion of the luster pigment Z1 on the surface of particles of the powder coating material c3 was not confirmed.

[Surface Treatment (Chemical Conversion Treatment) of Aluminum Plate]

In a treating solution adjusted to have concentration of 30 g/L and a temperature of 55° C. by diluting product name "Chemicleaner 514A" (manufactured by The Japan Cee-Bee Chemical Co., Ltd.) with water, an aluminum plate having a size of 150 mm×70 mm and a thickness of 2 mm (JIS A6063S-T5) was immersed for 5 minutes to subject the surface of the aluminum plate to degreasing treatment.

Then, the aluminum plate was washed with ion exchanged water at room temperature for 1 minute.

Further, in a treating solution adjusted to have a temperature of 25° C. and a concentration of 250 g/L by diluting product name "Cee-Bee B-21dL" (manufactured by The Japan Cee-Bee Chemical Co., Ltd.) with water, the aluminum plate after the degreasing was immersed for 3 minutes to subject the surface of the aluminum plate to acid etching treatment. The etched amount was 3.5 $g/m^2$.

Then, the aluminum plate was washed twice with ion-exchanged water at room temperature (each washing time: 1 minute). Then, in a treating solution adjusted to have a concentration of 50 g/L and a temperature of 45° C. by diluting product name "Chemibonder 5507" (manufactured by The Japan Cee-Bee Chemical Co., Ltd.) with water, the aluminum plate after the etching treatment was immersed for 2 minutes to subject the surface of the aluminum plate to chromium-free chemical conversion covering treatment.

Thereafter, the resulting aluminum plate surface was subjected to cleaning treatment (treatment time: 1 minute) twice using ion exchanged water at room temperature, and then the aluminum plate was dried for 5 minutes in an oven of 70° C.

[Evaluation Tests]

Using the respective powder coating materials, test specimens were produced as follows. Then, using the prepared respective test specimens, the following evaluation tests were conducted.

[Preparation of Test Specimens]

On one surface of the above-mentioned chemical conversion treated aluminum plates (substrates), the respective powder coating materials were electrostatically applied by means of an electrostatic coating machine equipped with a powder coating gun (manufactured by Onoda Cement Corporation, trade name: GX3600C). Then, the aluminum plates coated with the respective powder coating materials were maintained in a 200° C. atmosphere for 20 minutes, and then the resulting aluminum plates were left to stand and cooled to room temperature, to obtain aluminum plates (I) to (VIII) provided with coating films (cured films) having thicknesses of from 55 to 65 μm.

The resulting coating film-attached aluminum plates (I) to (VIII) were evaluated as test specimens (I) to (VIII). The results are shown in Table 1.

[Presence or Absence of Formation of Orange Peel (Rough Skin)]

The state of the coating film surface of a test specimen was visually observed to judge the presence or absence of formation of orange peel (rough skin).

[Presence or Absence of Formation of Pinholes]

The state of the coating film surface of a test specimen was visually observed and evaluated according to the following standards.

○ (good): No pinhole is formed in the coating film surface.

× (bad): Pinholes are formed in the coating film surface.

[Luster (Hue) of Coating Film]

The state of the coating film surface of a test specimen was visually observed and evaluated according to the following standards.

○ (very good): High metallic hue.

Δ (good): Average metallic hue.

× (bad): Low metallic hue.

[Color Unevenness]

With respect to a test specimen, color unevenness in the coating film was evaluated based on the following standards by visual observation.

○ (good): To the entire area of the coating film, the proportion of the area of a region where color unevenness is formed, is at most 20%.

Δ (normal): To the entire area of the coating film, the proportion of the area of a region where color unevenness is formed, is more than 20% and less than 40%.

× (bad): To the entire area of the coating film, the proportion of the area of a region where color unevenness is formed, is at least 40%.

[Orientation of Luster Pigment]

A test specimen was cut, and the cross-section of its coating film was observed by a microscope (manufactured by Keyence Corporation), whereby a disturbance in orientation of the luster pigment inside of the coating film was evaluated. The results were evaluated based on the following standards.

○ (good): The metallic pigment is oriented between two layers in parallel to the surface of the substrate (aluminum plate).

Δ (normal): There are both a portion where the metallic pigment is oriented between two layers in parallel to the surface of the substrate (aluminum plate) and a portion where a disturbance is observed in the orientation.

× (bad): There is a disturbance in the direction in which the metallic pigment is oriented.

[Weather Resistance (Exposure Test)]

A prepared test specimen was set up outdoor in Naha-city, Okinawa Prefecture and exposed for three years, to evaluate the weather resistance of the coating film.

By taking the 60° specular gloss value of the coating film before the test as 100%, the retention of the 60° specular gloss value of the coating film after the test (gloss retention) (%) was obtained. The 60° specular gloss value was measured by a gloss meter (micro-TRI-gross manufactured by BYK, incident reflection angle:)60°. Further, the color difference ΔE as between before and after the test was measured by a color difference meter (manufactured by Minolta; CR-300).

[Evaluation Results]

The results of the above evaluation tests are shown in Table 1.

TABLE 1

|  |  | Ex. 1 | Ex. 2 | Ex. 3 | Ex. 4 |
|---|---|---|---|---|---|
| Powder coating material | Type of powder coating method | 1 | 2 | 3 | 4 |
|  | Powder component (resin used) | Powder component 1 Fluorinated copolymer 1 Polyester resin | Powder component 1 Fluorinated copolymer 1 Polyester resin | Powder component 1 Fluorinated copolymer 1 Polyester resin | Powder component 2 Fluorinated copolymer 2 Polyester resin |

TABLE 1-continued

|  |  |  |  |  |  |  |
|---|---|---|---|---|---|---|
|  |  | Luster pigment | Luster pigment Z1 | Luster pigment Z1 | Luster pigment Z2 | Luster pigment Z1 |
|  | Plasticizer | Type | Plasticizer 1 | Plasticizer 1 | Plasticizer 2 | Plasticizer 1 |
|  |  | Timing for mixing to substrate particles | Before production of powder coating material | Before production of powder coating material | Before production of powder coating material | Before production of powder coating material |
|  |  | Mixing temperature during production of powder coating material | 45° C. | 30° C. | 45° C. | 45° C. |
| Evaluation results |  | Type of test specimen | I | II | III | IV |
|  |  | Presence or absence of formation of orange peel (rough skin) | Absent | Absent | Absent | Absent |
|  |  | Luster of coating film | ○ | ○ | ○ | Δ |
|  |  | Color unevenness | ○ | ○ | ○ | Δ |
|  |  | Formation of pinholes in coating film | ○ | ○ | ○ | ○ |
|  |  | Orientation of luster pigment | ○ | ○ | ○ | Δ |
|  | Weather resistance | Exposure test (gloss retention %) | 85.3 | 86.1 | 85.2 | 75.0 |
|  |  | Exposure test (color difference ΔE) | 1.9 | 1.9 | 2 | 3.5 |
|  |  |  | Ex. 5 | Ex. 6 | Ex. 7 | Ex. 8 |
| Powder coating material | Type of powder coating method |  | 5 | c1 | c2 | c3 |
|  | Powder component (resin used) |  | Powder component 1 Fluorinated copolymer 1 Polyester resin | Powder component 1 Fluorinated copolymer 1 Polyester resin | Powder component 1 Fluorinated copolymer 1 Polyester resin | Powder component 1 PVDF (Meth)acryl resin |
|  |  | Luster pigment | Luster pigment Z1 | Luster pigment 1 | Luster pigment 2 | Luster pigment Z1 |
|  | Plasticizer | Type | Plasticizer 1 | Plasticizer 1 | — | Plasticizer 1 |
|  |  | Timing for mixing to substrate particles | Before production of powder coating material | During production of powder coating material | — | Before production of powder coating material |
|  |  | Mixing temperature during production of powder coating material | 55° C. | 45° C. | 120° C. | 45° C. |
| Evaluation results |  | Type of test specimen | V | VI | VII | VIII |
|  |  | Presence or absence of formation of orange peel (rough skin) | Present | Absent | Present | Absent |
|  |  | Luster of coating film | Δ | Δ | x | x |
|  |  | Color unevenness | Δ | x | Δ | x |
|  |  | Formation of pinholes in coating film | ○ | x | ○ | ○ |
|  |  | Orientation of luster pigment | Δ | ○ | x | x |
|  | Weather resistance | Exposure test (gloss retention %) | 67.3 | 84.6 | 63.4 | 56.5 |
|  |  | Exposure test (color difference ΔE) | 5.5 | 2.1 | 6.6 | 7.5 |

As shown in Table 1, by using the powder coating material in Ex. comprising a powder component containing a fluorinated copolymer 1 and the luster pigment Z, it was possible to suppress formation of color unevenness and pinholes and to form a coating film excellent in weather resistance. Further, according to the powder coating materials in Ex. 1 to 5, it was possible to make the adhesion ratio of the luster pigment Z on the surface of particles of the powder component to be high without using a binder or solvent. Further, according to the powder coating materials in Ex. 1 to 5, orientation of the luster pigment contained in the coating film was excellent, and the luster of the coating film was also excellent.

Further, from the comparison between Ex. 1 and Ex. 4, it was found that when a vinyl ether having no fluorine atom was used as a monomer having no fluorine atom to be used in the production of a fluorinated copolymer, as compared with the case of using a vinyl ester having no fluorine atom, the orientation of the luster pigment contained in the coating film, the luster of the coating film and the weather resistance of the coating film were superior, and it was possible to further suppress formation of color unevenness in the coating film.

Further, as is evident from the comparison between Ex. 1 and Ex. 5, it was possible to suppress formation of orange peel by adjusting the mixing temperature during the production of the powder coating material to be below 50° C. Further, the orientation of the luster pigment contained in the coating film, the luster of the coating film and the weather resistance of the coating film were superior.

On the other hand, the powder coating material in Ex. 6 was one wherein the luster pigment Z of the present invention was not used, and a plasticizer was added during kneading of the luster pigment and the resin particles. According to the powder coating material in Ex. 6, it was not possible to suppress formation of color unevenness in the coating film. The reason for this is considered to be such that although the luster pigment was adhered to the fluorinated powder coating material, the adhered amount was insufficient. Further, it was not possible to obtain a coating film excellent in luster. This is considered to be such that affinity between the fluorinated copolymer and the plasticizer was so high that even in a normal temperature atmosphere, adhesion had proceeded. Further, in the coating film obtained by using the powder coating material in Ex. 7, pinholes were formed.

The powder coating material in Ex. 7 was one produced by a method of melt-kneading raw materials all at once without using a plasticizer. According to the powder coating material in Ex. 7, formation of color unevenness in the coating film was suppressed, but the luster pigment was not cleanly oriented in the coating film, and further, deformation or oxidation of the aluminum pigment occurred during the kneading, and as a result, the luster of the coating film was low. Further, the weather resistance was also insufficient.

The powder coating material in Comparative Example 3 was one produced by not using the fluorinated powder coating material of the present invention although the luster pigment Z of the present invention was used. According to the powder coating material in Comparative Example 3, it was difficult to let the luster pigment be adhered to the surface of the resin particles, and as a result, it was not possible to suppress formation of color unevenness in the coating film. Further, it was not possible to obtain a coating film excellent in luster. Further, the luster pigment in the coating film was not cleanly oriented.

This application is a continuation of PCT Application No. PCT/JP2016/088973, filed on Dec. 27, 2016, which is based upon and claims the benefit of priority from Japanese Patent Application No. 2016-000186 filed on Jan. 4, 2016. The contents of those applications are incorporated herein by reference in their entireties.

What is claimed is:

1. A powder coating material comprising a resin powder component containing a fluorinated copolymer which has repeating units based on a fluoroolefin and repeating units based on a monomer having no fluorine atom, and which has a fluorine content of at least 10 mass %, and a plasticizer-covered luster pigment composed of luster pigment particles with their surface covered by a plasticizer, wherein
the plasticizer is a plasticizer which has a melting point of from 30 to 200° C. and a molecular weight of from 200 to 1,000, and which has from 1 to 4 ester groups in one molecule.

2. The powder coating material according to claim 1, wherein the powder coating material comprises resin particles containing the fluorinated copolymer and particles of the plasticizer-covered luster pigment, and on the surface of the resin particles, the plasticizer-covered luster pigment particles are adhered.

3. The powder coating material according to claim 1, wherein the covering amount of the plasticizer in the plasticizer-covered luster pigment is from 0.01 to 10.0 mass % to the luster pigment before being covered by the plasticizer.

4. The powder coating material according to claim 1, wherein particles of the plasticizer-covered luster pigment contain, between the luster pigment particles and the plasticizer covering layer, a synthetic resin layer containing a synthetic resin.

5. The powder coating material according to claim 4, wherein the synthetic resin in the synthetic resin layer is a synthetic resin selected from the group consisting of a (meth)acrylic resin, an epoxy resin, a silicone resin, a polyester resin, a fluororesin, a terpene-type resin, a terpene phenol-type resin, a hydrogenated terpene-type resin and a hydrogenated terpene phenol-type resin.

6. The powder coating material according to claim 1, wherein the luster pigment consists of aluminum particles, mica particles or pearl particles.

7. The powder coating material according to claim 1, wherein the fluorinated copolymer is a fluorinated copolymer wherein, based on all repeating units which the fluorinated copolymer has, the content of repeating units based on the fluoroolefin is from 20 to 70 mol %, and the content of repeating units based on the monomer having no fluorine atom is from 30 to 80 mol %.

8. The powder coating material according to claim 1, wherein the monomer having no fluorine atom is a vinyl ether having no fluorine atom.

9. The powder coating material according to claim 1, wherein the content of the plasticizer-covered luster pigment is from 0.1 to 30 parts by mass to 100 parts by mass of the content of said powder component.

10. The powder coating material according to claim 1, wherein said powder component further contains at least one resin selected from the group consisting of a polyester resin, a (meth)acrylic resin and an epoxy resin, and a pigment other than a luster pigment.

11. A method for producing a powder coating material as defined in claim 1, which comprises mixing said resin powder component and said luster pigment at a temperature of less than 50° C., to let particles of the plasticizer-covered luster pigment be adhered to a particle surface of said resin powder component.

12. A coated article comprising a substrate and a coating film formed on the substrate by the powder coating material as defined in claim 1.

* * * * *